(12) United States Patent
Maeda et al.

(10) Patent No.: US 6,477,904 B2
(45) Date of Patent: *Nov. 12, 2002

(54) INPUT DEVICE PROVIDED WITH STRAIN GAGES

(75) Inventors: Ryoichi Maeda; Kazuo Kaneo; Takeshi Akahama, all of Miyagi-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,243

(22) Filed: Oct. 12, 1999

(65) Prior Publication Data

US 2002/0011122 A1 Jan. 31, 2002

(30) Foreign Application Priority Data

Oct. 12, 1998 (JP) ............................................. 10-289529

(51) Int. Cl.⁷ ................................................. G01L 1/22
(52) U.S. Cl. .................................................. 73/862.044
(58) Field of Search ..................... 73/862.045, 862.044, 73/862.04, 862.67, 862.05, 862.06, 862.65, 825, 726

(56) References Cited

U.S. PATENT DOCUMENTS

| 4,680,577 A |  | 7/1987 | Straayer et al. |
| 5,754,167 A | * | 5/1998 | Narusawa et al. .......... 345/161 |
| 5,811,694 A | * | 9/1998 | Kamenster et al. ..... 73/862.045 |
| 5,867,808 A | * | 2/1999 | Selker et al. .................. 702/41 |

* cited by examiner

Primary Examiner—Max Noori
(74) Attorney, Agent, or Firm—Brinks Hofer Gilson & Lione (57) ABSTRACT

An input device has a control member having an operating part and a base part. The base part has arms and connecting parts connecting the adjacent arms. Strain gages are placed on the arms, respectively. Projections are formed on the connecting parts or a holding member for holding the control member thereon to secure spaces between the arms and the holding member to enable the arms to be strained greatly when the operating part is tilted so that the respective electrical resistances of the strain gages can be changed greatly for the slight tilting of the operating part of the control member.

7 Claims, 6 Drawing Sheets

INPUT DEVICE PROVIDED WITH STRAIN GAGES

BACKGROUND OF THE INVENTION

1. Field of the Invention

The present invention relates to an input device provided with strain gages to be used in combination with a computer or the like.

2. Description of the Related Art

Figure 13:
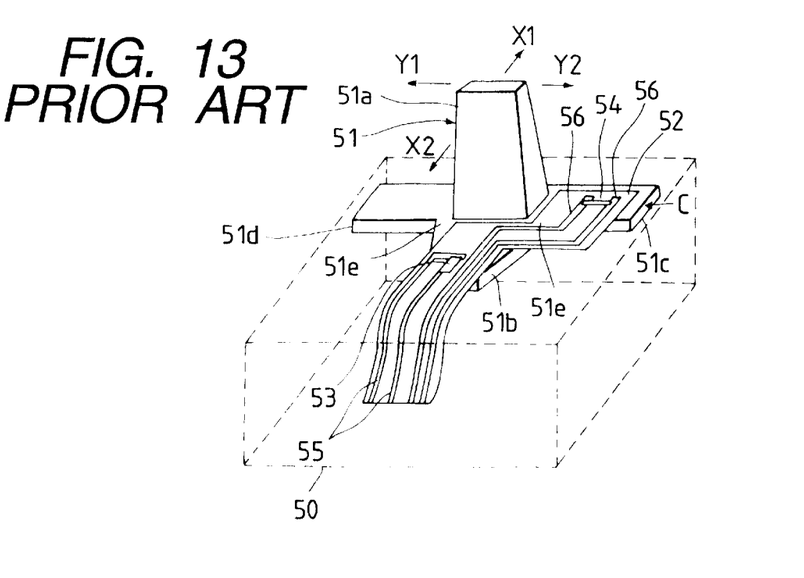
FIG. 13 is a perspective view of a conventional input device.

Referring to FIG. 13, a conventional input device provided with strain gages has control member 51, formed of a flexible synthetic resin and having an operating part 51*a* formed in a shape resembling a rectangular a solid, three planar base parts, i.e., a first base part 51*b*, a second base part 51*c* and a third base part 51*d*, extending under the operating part 51*a* at right angles to each other, and a joining part 51*e* underlying the operating part 51*a* and joining together the planar base parts 51*b*, 51*c* and 51*d*. The control member 51 is mounted on a frame member 50 of a keyboard combined with a computer with the lower surfaces of the base parts 51*b*, 51*c* and 51*d* in contact with the frame member 50, and with the free ends of the base parts 51*b*, 51*c* and 51*d* pressed against the frame member 50.

When operating part 51*a* of the control member 51 is tilted in directions X1, X2, Y1 or Y2, the base parts 51*b*, 51*c* and 51*d* are warped. Strains of the base parts 51*b*, 51*c* and 51*d* vary according to the inclination of the operating part 51*a*.

A first strain gage 53 and a second strain gage 54 having resistors, and leads 55, 56 formed by printing a conductive ink containing silver and connected to the strain gages 53 and 54 are placed on one surface of a flexible wiring board 52.

A portion of the other surface of the flexible wiring board 52 opposite the surface on which the strain gages 53 and 54 are placed is bonded to upper surfaces of the base parts 51*b* and 51*c* extending at right angles to each other with an adhesive. The strain gages 53 and 54 are attached to the base part 51*b* and the 51*c*, respectively.

When the operating part 51*a* of the control member 51 is tilted in the direction X1, the first base part 51*b* is warped so that the upper surface thereof is stretched. Consequently, the first strain gage 53 attached to the upper surface of the first base part 51*b* is stretched and its electrical resistance increases. When the operating part 51*a* is tilted in the direction X2, the first strain gage 53 attached to the upper surface of the first base part 51*b* is compressed together with the upper surface of the first base part 51*b* and its electrical resistance decreases. Similarly, the electrical resistance of the second strain gage 54 increases when the operating part 51*a* is tilted in the direction Y1 and the same decreases when the operating part 51*a* is tilted in the direction Y2. Changes in the electrical resistances of the strain gages 53 and 54 are converted into voltage changes, the voltage changes are read by a computer, and the computer controls a cursor for movement in vertical and horizontal directions according to the tilting direction of the operating part 51*a*, i.e., the directions X1, X2, Y1 and Y2.

Since the lower surfaces of the base parts 51*b*, 51*c* and 51*d* of the control member are entirely in contact with the frame member 50, the base parts 51*b* and 51*c* cannot be greatly warped and, the operation of the input device is not satisfactory. Base end parts of the base parts 51*b* and 51*c* of the operating part 51*a* are joined to the joining part 51*e*. Therefore, the second base part 51*c* and the strain gage 54 attached thereto, which should not be strained, are nevertheless strained through the joining part 51*e* by the turning of the operating part 51*a* in the directions X1 and X2 to strain the strain gage 53 attached to the first base part 51*b*. Similarly, the first base part 51*b* and the strain gage 53 attached thereto, which should not be strained, are nevertheless strained through the joining part 51*e* by the turning of the operating part 51*a* in the directions Y1 and Y2 to strain the strain gage 54 attached to the second base part 51*c*. Thus, the strain gages 53 and 54 are strained and the electrical resistances thereof changes greatly when the same should not be strained.

Since a restriction on the position of the base parts 51*b*, 51*c* and 51*d* on the frame member 50 sets limits to the lengths of the base parts 51*b*, 51*c* and 51*d* of the control member 51 because the free end parts of is attached to the frame member 50, the first base part 51*b* and the second base part 51*c* have different lengths, respectively. Consequently, the strain gages 53 and 54 differ greatly from each other in the changing mode of resistance and the functions of the strain gages 53 and 54 do not correspond accurately to the operation of the control member 51. Since the base parts 51*b*, 51*c* and 51*d* are attached to the frame member 50, the operation of the keyboard affects the condition of the base parts 51*b*, 51*c* and 51*d* and causes the cursor to move.

SUMMARY OF THE INVENTION

Accordingly, it is an object of the present invention to provide an input device provided with strain gages and capable of accurately controlling a cursor displayed on a display controlled by a computer.

According to a first aspect of the present invention, an input device comprises: a control member having an operating part, and a planar base part having a portion connected to the operating part and extending in a plane perpendicular to the axis of the operating part; strain gages placed on an upper surface of the base part; and a planar holding member holding the control member; wherein the base part has a plurality of arms having end portions connected to the operating part and extending at an angle of 90° to each other in a plane perpendicular to the axis of the operating part, and connecting parts connecting the adjacent arms. The connecting parts or the holding member is provided with projections to secure spaces between the arms provided with the strain gages, and the holding member, and the control member is held on the holding member.

Preferably, the projections are formed on the connecting parts so as to be in contact with the holding member to secure the spaces between the arms and the holding member.

Preferably, the arms are arranged in a cross-shaped arrangement.

Preferably, the base part has openings defined by the adjacent arms and the connecting parts.

Preferably, the connecting parts of the control member are fastened to the holding member.

Preferably, the holding member has a holding part on which the base part of the control member is mounted, and arms extending from the holding part, and the arms are provided with support portions having a bending strength greater than that of the holding part.

Preferably, the holding member is formed by shaping a metal plate, and the support parts are formed by folding up portions of the metal plate.

According to a second aspect of the present invention, an input device comprises: a control member having an operating part, and a planar base part having a portion connected to the operating part and extending in a plane perpendicular to the axis of the operating part; strain gages placed on an upper surface of the base part; and a holding member holding the control member; wherein the base part has a plurality of arms having inner end portions connected to the operating part and extending at an angle of 90° to each other in a plane perpendicular to the axis of the operating part, and connecting parts connecting the adjacent arms; the strain gages are placed on the arms; and the connecting parts are fastened to the holding member.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 8:
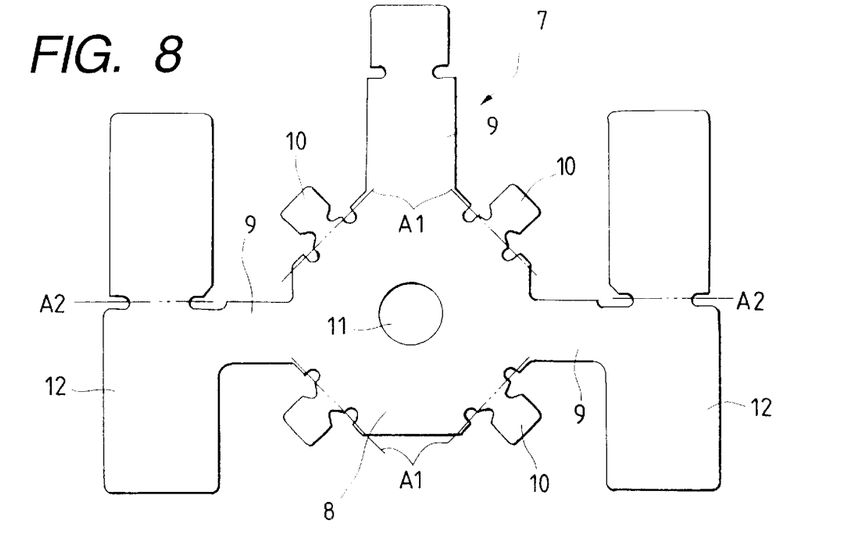
FIG. 8 is a plan view of a blank for forming the support member.
Figure 9:
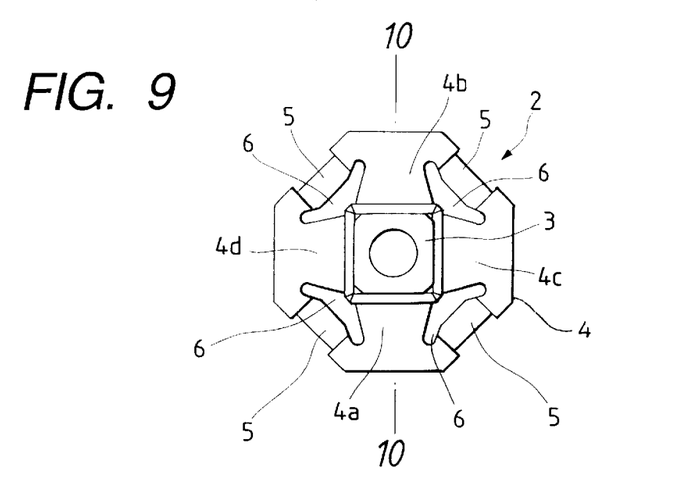
FIG. 9 is a plan view of a control member included in the input device shown in FIG. 1.
Figure 10:
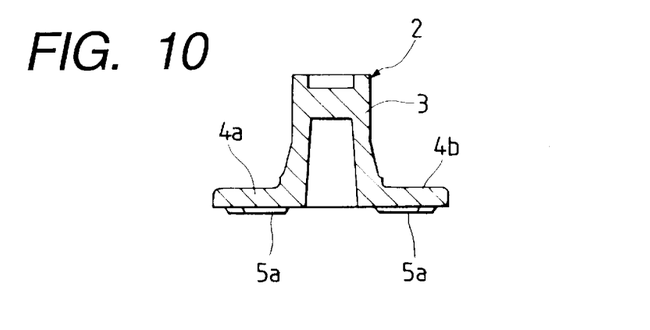
FIG. 10 is a sectional view taken on line 10—10 in FIG. 9.

An input device in a first embodiment according to the present invention will be described with reference to FIGS. 1 to 10. Referring to FIGS. 1 to 10, a mounting plate 1 is made of a relatively thick metal plate and serves as a member of the frame of a keyboard. The mounting plate 1 is provided with a plurality of lugs 1a formed by raising portions thereof. A flexible control member 2 is formed of a synthetic resin or a glass-fiber-reinforced synthetic resin, such as a modified polyphenylene ether. As best shown in FIGS. 9 and 10, the control member 2 has a hollow operating part 3 having a shape resembling a rectangular solid, and a planar base part 4 extending in a plane perpendicular to the axis of the operating part 3. The base part 4 has four arms 4a, 4b, 4c and 4d having inner ends of the same thickness connected to the operating part 3 and formed in a cross-shaped arrangement, and connecting parts 5 connected to the outer ends of the adjacent arms 4a, 4b, 4c and 4d. The angle between the adjacent arms 4a, 4b, 4c and 4d is 90°. The connecting parts 5 are provided on their lower surfaces with downward projections 5a. Substantially triangular openings 6 are defined by the adjacent arms 4a, 4b, 4c and 4d, and the connecting parts 5.

Figure 1:
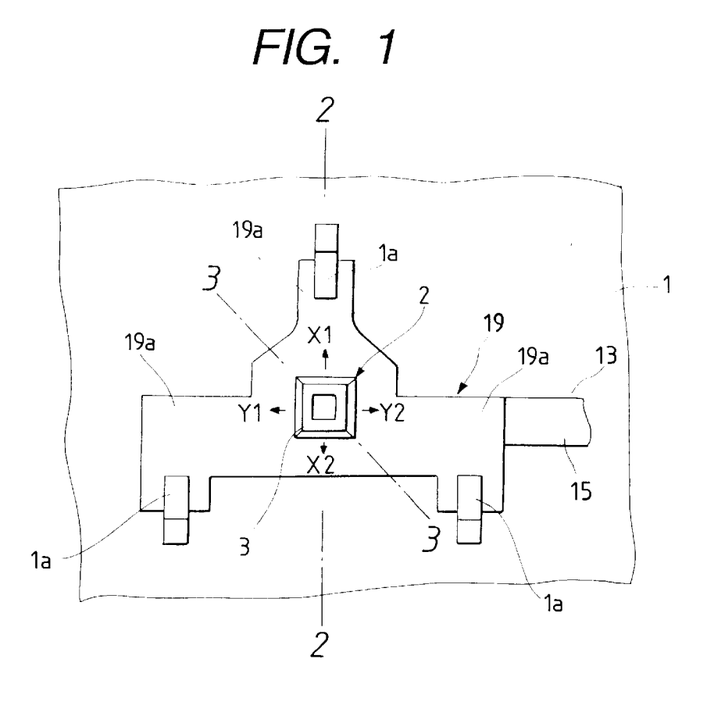
FIG. 1 is a plan view of an input device in a preferred embodiment according to the present invention.

Referring to FIG. 1, the operating part 3 can be tilted in directions X1, X2, Y1 and Y2 as indicated by the arrows. When the operating part 3 is tilted in the directions X1, X2, Y1 or Y2, the arms 4a, 4b, 4c and 4d are bent accordingly so that the upper surfaces thereof are stretched or compressed. The openings 6 formed between the adjacent arms 4a, 4b, 4c and 4d operatively isolates the arms 4a, 4b, 4c and 4d from each other so that the arms 4a, 4b, 4c and 4d are able to be bent individually with out affecting each other when the operating part 3 is tilted. As shown in FIGS. 9 and 10, each of the arms 4a, 4b, 4c and 4d is formed in a shape substantially resembling a trapezoid having a wide inner end and a narrow outer end to suppress the local bending of an inner part thereof greater than the local bending of an outer part thereof and to make the same to be bent uniformly.

Figure 6:
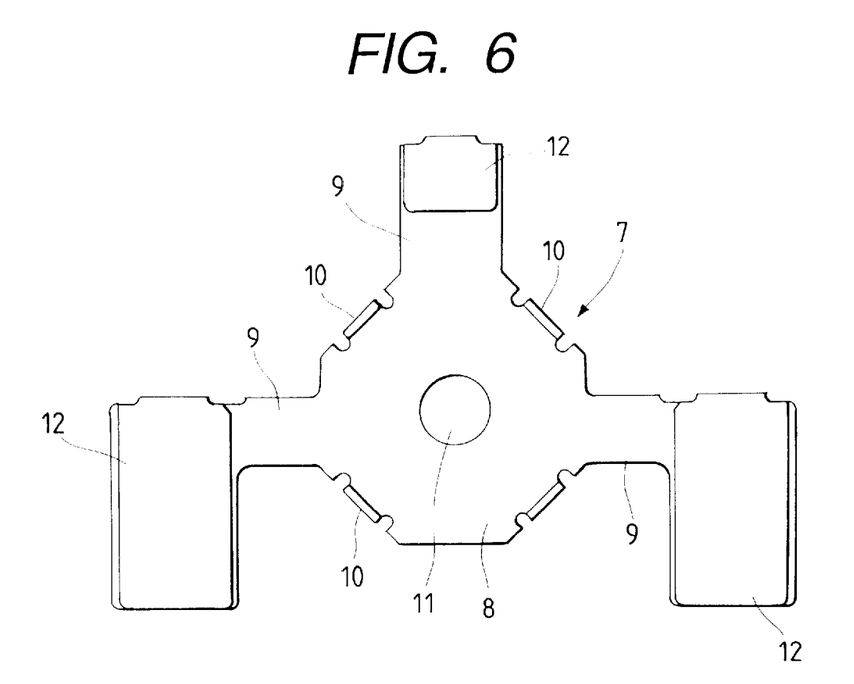
FIG. 6 is a plan view of a support member included in the input device shown in FIG. 1.
Figure 7:
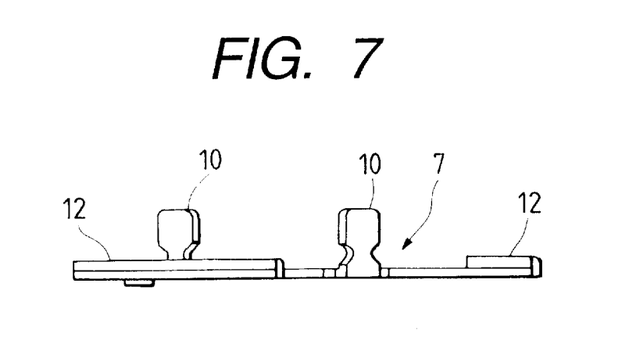
FIG. 7 is a side elevation of the support member shown in FIG. 6.

Referring to FIGS. 6 and 7, a planar holding member 7 formed by processing a metal plate has an octagonal holding part 8 on which the base part 4 of the control member 2 is mounted, and three arms 9 extending in three directions, respectively, from the holding part 8. The holding part 8 has four upright projections 10 formed by bending portions of the holding part 8, and a central opening 11. Each of the arms 9 has a support part 12 formed by folding up a free end portion of the arm 9 and having a bending strength greater than that of the holding part 8. The holding member 7 is formed by punching out a blank as shown in FIG. 8 having parts corresponding to the holding part 8, the arms 9 and the upright projections 10 from a metal plate, bending portions of the blank corresponding to the upright projections 10 along chain double-dash lines A1, and forming the support part 12 by folding up outer end portions of the parts corresponding to the arms 9 along chain double-dashed lines A2.

Figure 2:
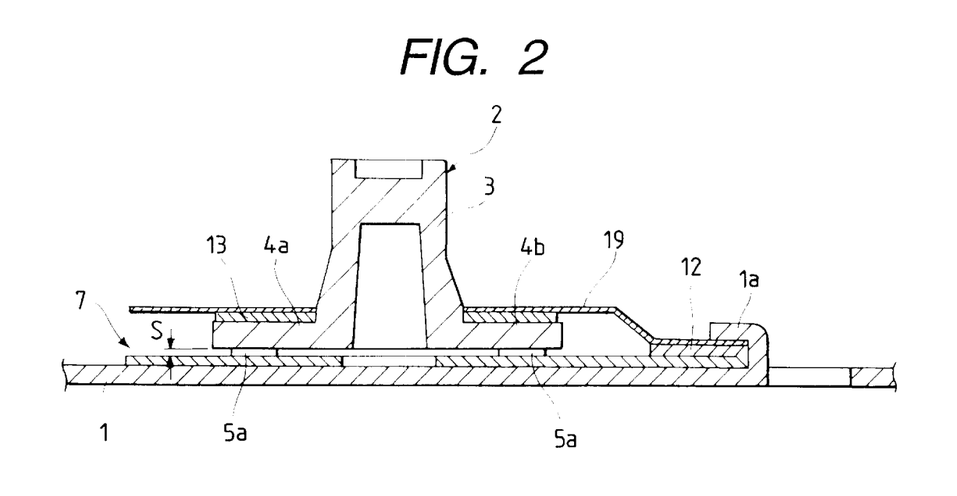
FIG. 2 is a sectional view taken on line 2—2 in FIG. 1.
Figure 3:
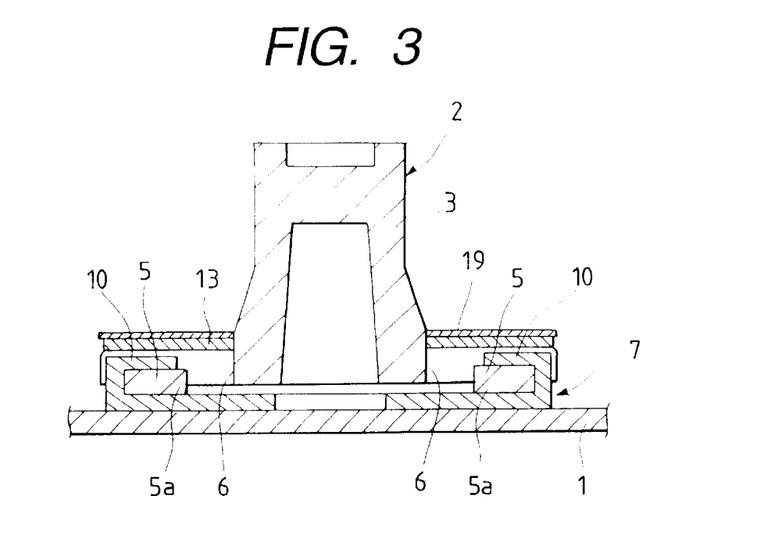
FIG. 3 is a sectional view taken on line 3—3 in FIG. 1.

Referring to FIGS. 2 and 3, the control member 2 is mounted on the holding member 7 with the projections 5a of the connecting parts 5 of the base part 4 in contact with the holding part 8 of the holding member 7. The control member 2 is joined to the holding member 7 by bending the upright projections 10 over the connecting parts 5 so as to hold the connecting parts 5 with the folded projections 10. When the control member 2 is thus joined to the holding member 7, the projections 5a secure spaces S between the arms 4a, 4b, 4c and 4d, and the holding member 7 to enable the operating part 3 to bend the arms 4a, 4b, 4c and 4d sufficiently. As shown in FIGS. 1 and 2, the holding member 7 combined with the control member 2 is mounted on the mounting plate 1, the lugs 1a are bent over the support part 12 to hold the support part 12 on the mounting plate 1 with the bent lugs 1a.

Since the support parts 12 having a high bending strength are held by the bent lugs 1a when the holding member 7 is thus attached to the mounting plate 1, the support parts 12 are bent only a little, the holding part 8 is affected scarcely by bending, and hence the control member 2, particularly, the arms 4a, 4b, 4c and 4d are not bent.

Figure 4:
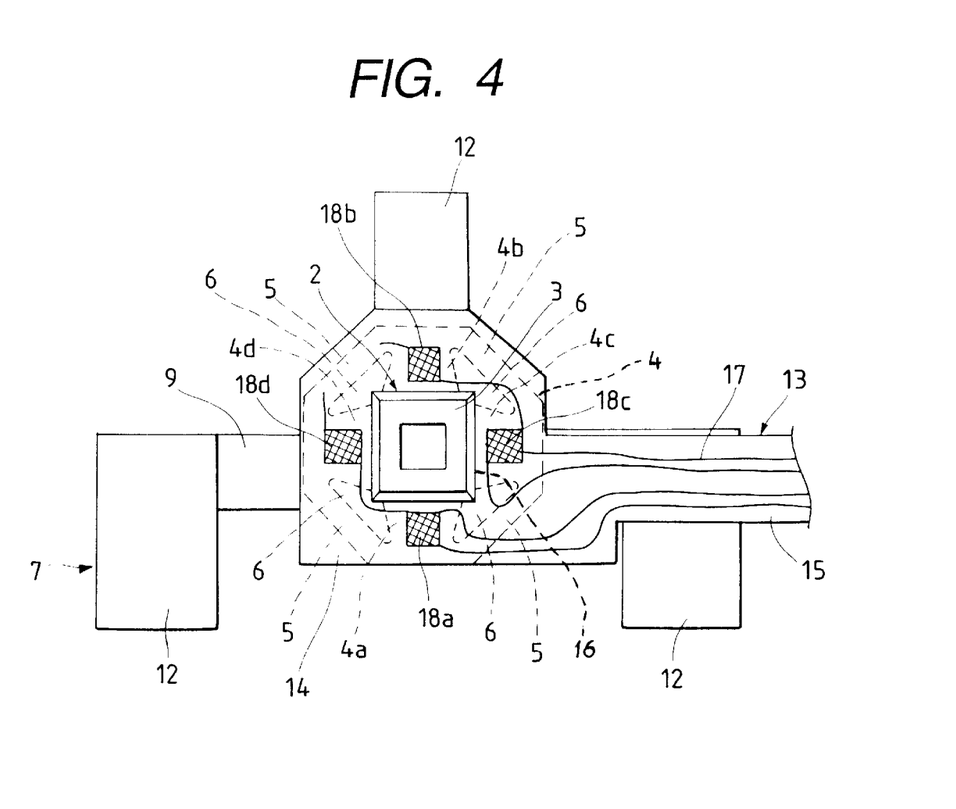
FIG. 4 is a plan view of the input device shown in FIG. 1, in which a shielding plate is removed.
Figure 5:
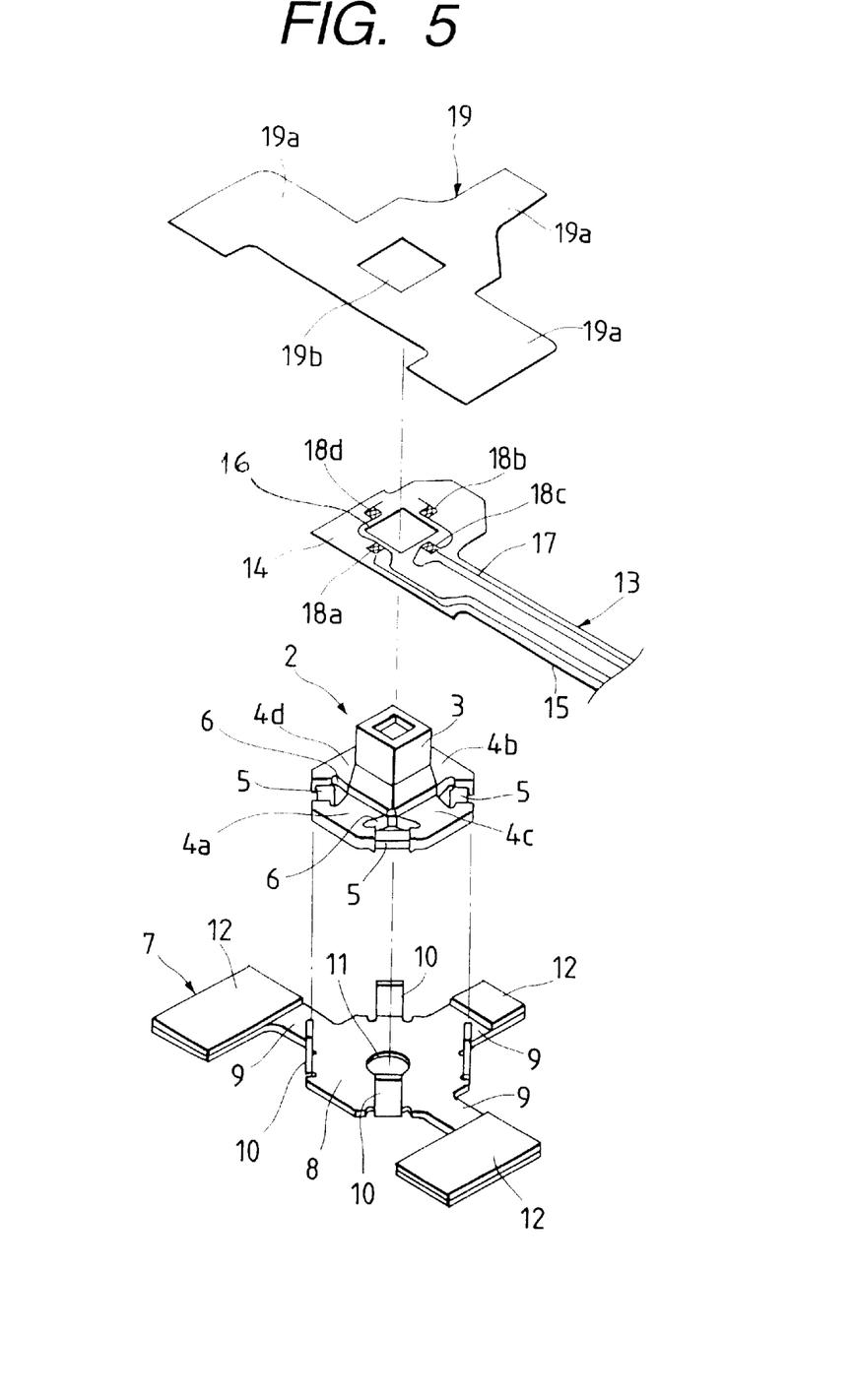
FIG. 5 is an exploded perspective view of the input device shown in FIG. 1.

The spaces S between the arms 4a, 4b, 4c and 4d, and the holding member 7 are secured by the projections 5a formed on the connecting parts 5 in this embodiment. Projections, not shown, may be formed on the holding member 7 at positions corresponding to the connecting parts 5 to secure the spaces As best shown in FIGS. 4 and 5, a flexible wiring board 13 like a film formed of an insulating material, such as a polyimide, has a strain gage holding part 14 provided with a square opening 16, and an elongate part 15 projecting from one side of the strain gage holding part 14. Conductive lines 17 are formed in a pattern by printing a silver paste on the upper surface of the flexible wiring board 13.

Strain gages 18a, 18b, 18c and 18d are formed on the upper surface of the flexible wiring board 13 at positions on the opposite sides of the square opening 16 and are connected to the conductive lines 17. The strain gages 18a, 18b, 18c and 18d are formed by printing an electrically resistive ink. The upper surface of the flexible wiring board 13 is coated with an electrically insulating resist film, not shown, so as to cover the strain gages 18a, 18b, 18c and 18d and the conductive lines 17.

As shown in FIG. 4, the operating part 3 of the control member 2 is passed through the square opening 16 of the flexible wiring board 13, and the flexible wiring board 13 is bonded to the upper surface of the base part 4 of the control member 2, i.e., the upper surfaces of the arms 4a, 4b, 4c and 4d, with an epoxy adhesive spread over the lower surface of the strain gage holding part 14. When the flexible wiring board 13 is thus bonded to the upper surface of the base part 4, the strain gages 18a, 18b, 18c and 18d overlie the arms 4a, 4b, 4c and 4d, respectively.

The strain gages 18b and 18d may be omitted and only the strain gages 18a and 18c may be used.

A metal shielding plate 19 is formed of an aluminum foil or the like and is substantially the same in shape as the holding member 7. The shielding plate 19 has three arms 19a extending in three directions, respectively, and is provided with a central opening 19b. As shown in FIGS. 1 to 3, the shielding plate 19 is put on the operating part 3 of the control member 2 so that the operating part 3 extends through the central opening 19b. The shielding plate 19 is seated on the flexible wiring board 13 and the holding member 7, and bonded to the flexible wiring board 13 and the holding member 7 with an adhesive so as to cover the flexible wiring board 13 entirely.

The holding member 7 holding the control member 2, the flexible wiring board 13 and the shielding plate 19 is mounted on the mounting plate 1 as shown in FIGS. 1 to 3, and the lugs 1a of the mounting plate 1 are bent toward the support parts 12. Thus, the arms 19a of the shielding plate 19 are depressed together with the support parts 12 to hold the holding member 7 on the mounting plate 1. The shielding plate 19 is electrically connected to the lugs 1a to shield electrically the conductive lines 17 and the strain gages 18a, 18b, 18c and 18d of the flexible wiring board 13 put on the control member 2.

When the operating part 3 of the control member 2 is tilted in the direction X1, the upper surface of the arm 4a is stretched and the upper surface of the arm 4b is compressed. Consequently, the resistance of the strain gage 18a overlying the arm 4a increases and the resistance of the strain gage 18b overlying the arm 4b decreases. When the operating part 3 of the control member 2 is tilted in the direction X2, the upper surface of the arm 4a is compressed and the upper surface of the arm 4b is stretched. Consequently, the resistance of the strain gage 18a overlying the arm 4a decreases and the resistance of the strain gage 18b overlying the arm 4b increases. Thus, voltages across the strain gages 18a and 18b vary according to the direction and the angle of tilt of the operating member 3. The cursor is moved along the X-axis according to the difference between a voltage across the strain gage 18a and a voltage across the strain gage 18b.

When the operating part 3 of the control member 2 is tilted in the direction Y1, the upper surface of the arm 4c is stretched and the upper surface of the arm 4d is compressed. Consequently, the resistance of the strain gage 18c overlying the arm 4c increases and the resistance of the strain gage 18d overlying the arm 4d decreases. When the operating part 3 of the control member 2 is tilted in the direction Y2, the upper surface of the arm 4c is compressed and the upper surface of the arm 4d is stretched. Consequently, the resistance of the strain gage 18c overlying the arm 4c decreases and the resistance of the strain gage 18d overlying the arm 4d increases. Thus, voltages across the strain gages 18c and 18d vary according to the direction and the angle of tilt of the operating member 3. The cursor is moved along the Y-axis according to the difference between a voltage across the strain gage 18c and a voltage across the strain gage 18d.

Static electricity generated by the operation of the control member 3 is transferred through the shielding plate 19 to the mounting plate 1. Therefore, the conductive lines 17 and the strain gages 18a, 18b, 18c and 18d formed on the flexible wiring board 13 put on the control member 2 are protected from the static electricity.

Figure 11:
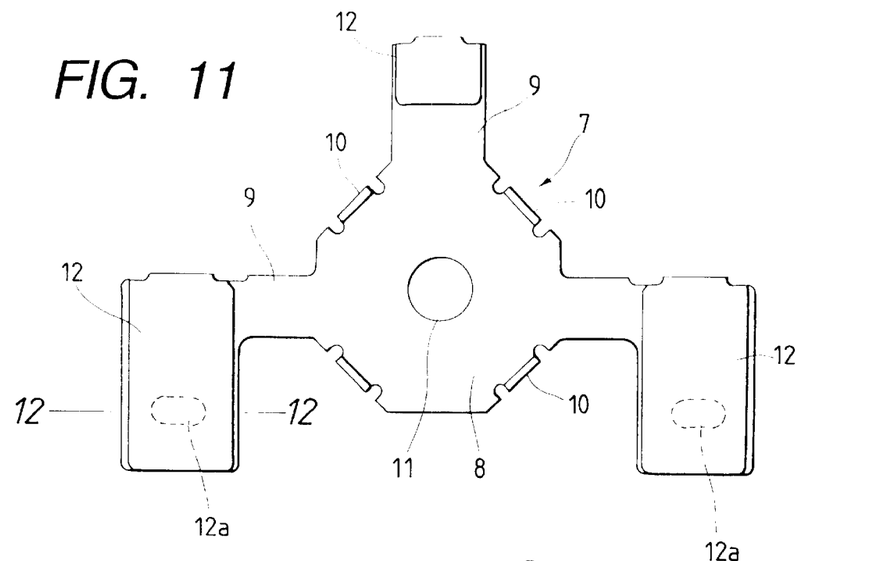
FIG. 11 is a plan view of an input device in another embodiment according to the present invention.
Figure 12:
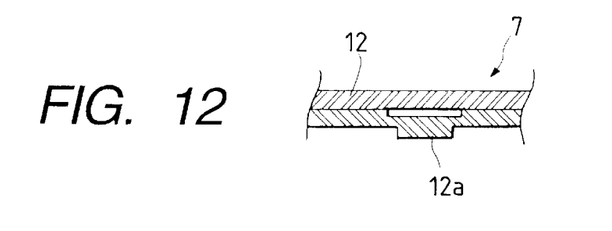
FIG. 12 is a sectional view taken online 12—12 in FIG. 11.

FIGS. 11 and 12 show an input device in another embodiment according to the present invention. The holding member 7 shown in FIGS. 11 and 12 is similar to the holding member 7 included in the foregoing input device, except that the holding member 7 in this embodiment has support parts 12 provided on their lower surface with positioning projections 12a. The positioning projections 12a are fitted in openings formed in a mounting plate 1 of a keyboard to facilitate positioning the holding member 7 on the mounting plate 1.

In the input device of the present invention, the projections 5a are formed on the connecting parts 5 of the base part 4 of the control member 2 or the holding member 7 to secure the spaces S between the arms 4a to 4d of the base part 4 and the holding member 7. Therefore, the arms 4a to 4d can be greatly bent by tilting the operating part 3 of the control member 2 to change the respective resistances of the strain gages 18a to 18d greatly when the operating part 3 is tilted. Therefore, the output of the input device is highly sensitive to the operation of the control member 2.

Since the spaces S are secured between the arms 4a to 4d and the holding member 7 by the projections 5a formed on the connecting parts 5 in contact with the holding member 7, the arms 4a to 4d can surely be spaced apart from the holding member 7. Thus, the input device is simple in construction and is capable of being manufactured at a high productivity.

Since the arms 4a to 4d are arranged at angular intervals of 90°, two strain gages can be placed on the two adjacent arms separated from each other by an angular interval of 90° and hence the input device has a large degree of freedom of design. The four strain gages 18a to 18d can be placed at positions respectively corresponding to the arms 4a to 4d. Therefore, the control member 2 can commonly be applied to various products and the input device can be manufactured at a high productivity.

Since the base part 4 is provided with the openings 6 defined by the adjacent arms 4a to 4d and the connecting parts 5 connecting the adjacent arms 4a to 4d, and the strain gages 18a to 18d are disposed at positions respectively corresponding to the arms 4a to 4d, the arms 4c and 4d are not strained when the operating part 3 of the control member 2 is tilted in the direction X1 or X2, and the arms 4a and 4b are not strained when the operating part 3 of the control member 2 is tilted in the direction Y1 or Y2. Consequently, only the strain gage that should to be strained will be strained and the input device functions satisfactorily and with high accuracy.

Since the connecting parts 5 of the control member 2 are fastened to the holding member 7, the lengths between the operating part 3 and the free ends of the arms 4*a* to 4*d* are the same, and the strain gages 18*a* to 18*d* have the same ratio of resistance change to strain and the input device functions satisfactorily and with high accuracy.

Since the support parts 12 of the holding member 7 have a bending strength higher than that of the holding part 8 of the holding member 7, the holding part 8 is not affected by bending force exerted on the support parts 12 when fastening the holding member 7 to the mounting plate 1. Therefore, the input device functions satisfactorily and with high accuracy.

Since the support parts 12 are formed by folding up portions of a metal plate, the holding member 7 is simple in construction. Therefore, the input device is inexpensive and can be manufactured at a high productivity.

Since the connecting parts 5 are fastened to the holding member 7, the arms 4*a* to 4*d* supporting the strain gages 18*a* to 18*d* are not affected significantly by the operation of the keys of the keyboard. Therefore, the input device functions satisfactorily and with high accuracy.

Although the invention has been described in its preferred embodiment with a certain degree of particularity, obviously many changes and variations are possible therein. It is therefore to be understood that the present invention may be practiced otherwise than as specifically describe herein without departing from the scope and spirit thereof.

What is claimed is:

1. An input device comprising:

a control member having an operating part and a planar base part, said base part being connected to the operating part and extending in a plane perpendicular to an axis of the operating part; and a planar holding member having engaging portions for holding the base part of the control member, said holding member being disposed in a plane that is spaced apart from and generally parallel to the plane of the base part, wherein the base part comprises a plurality of arms each having an inner end connected to the operating part and extending therefrom in a radial direction in the plane perpendicular to the axis of the operating part, each of said arms terminating in an outer end, the base part further comprising connecting parts connecting adjacent pairs of arms to each other, said connecting parts being connected near the outer ends of said arms and spaced apart from said operating part so as to form an opening in the base part between the operating part, adjacent pairs of arms, and an inside edge of each connecting part, wherein strain gages are placed on each of the arms, wherein each of the connecting parts is provided with a downwardly projecting protrusion that is in contact with the holding member, the protrusion on each connecting part projecting generally perpendicular to the plane of the base part so as to contact an upper surface of the holding member and form a space between the arms of the base part and the holding member, said space preventing the holding member from interfering with a flexing of the arms resulting from movement of the operating member, and wherein the engaging portions of the holding member are arranged so as to engage with and secure the connecting parts of the base part.

2. The input device according to claim 1, wherein the plurality of arms are arranged in a cross-shaped arrangement.

3. The input device according to claim 1, wherein the holding member has a planar holding part positioned below the base part of the control member, and arms extending outwardly from the holding part, the arms being provided with support portions having a bending strength that is greater than a bending strength of the holding part.

4. The input device according to claim 3, wherein the holding member is formed by shaping a metal plate, and the engaging portions and the support portions are formed by folding up portions of the metal plate.

5. An input device comprising:

a control member having an operating part and a planar base part, said base part being connected to the operating part and extending in a plane perpendicular to an axis of the operating part; and a planar holding member having engaging portions for holding the base part of the control member, said holding member being disposed in a plane that is spaced apart from and generally parallel to the plane of the base part, wherein the base part comprises a plurality of arms each having an inner end connected to the operating part and extending therefrom in a radial direction in the plane perpendicular to the axis of the operating part each of said arms terminating in an outer end, the base part further comprising connecting parts connecting adjacent pairs of arms to each other, said connecting parts being connected near the outer ends of said arms and spaced apart from said operating part so as to form an opening in the base part between the operating part, adjacent pairs of arms, and an inside edge of each connecting part, wherein strain gages are placed on each of the arms, wherein the holding member is provided with projections that extend upwardly towards the base part, the projections being disposed adjacent to said connecting parts and projecting generally perpendicular to the plane of the holding member so as to contact a lower surface of the connecting parts and form a space between the arms of the base part and the holding member, said space preventing the holding member from interfering with a flexing of the arms resulting from movement of the operating member, and wherein the engaging portions of the holding member are arranged so as to engage with and secure the connecting parts of the base part.

6. An input device according to claim 1, wherein each of said plurality of arms has a substantially trapezoidal shape, said outer end being narrower in width than said inner end.

7. An input device according to claim 5, wherein each of said plurality of arms has a substantially trapezoidal shape, said outer end being narrower in width than said inner end.

* * * * *